United States Patent
Haertel et al.

(10) Patent No.: US 7,882,330 B2
(45) Date of Patent: *Feb. 1, 2011

(54) VIRTUALIZING AN IOMMU

(75) Inventors: Michael Haertel, Sunnyvale, CA (US);
Mark D. Hummel, Franklin, MA (US);
Andrew W. Lueck, Austin, TX (US);
Geoffrey S. Strongin, Austin, TX (US);
Mitchell Alsup, Austin, TX (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 12/562,262

(22) Filed: Sep. 18, 2009

(65) Prior Publication Data

US 2010/0011147 A1 Jan. 14, 2010

Related U.S. Application Data (63) Continuation of application No. 11/623,626, filed on Jan. 16, 2007, now Pat. No. 7,613,898.

(60) Provisional application No. 60/759,826, filed on Jan. 17, 2006.

(51) Int. Cl.
*G06F 12/10* (2006.01)
(52) U.S. Cl. .................. 711/206; 711/203; 711/207
(58) Field of Classification Search .................. None
See application file for complete search history.

(56) References Cited

U.S. PATENT DOCUMENTS

| | | | |
|---|---|---|---|
| 4,550,368 A | 10/1985 | Bechtolsheim | |
| 5,301,287 A | 4/1994 | Herrell et al. | |
| 5,949,436 A | 9/1999 | Horan et al. | |
| 5,987,557 A | 11/1999 | Ebrahim | |
| 6,785,886 B1 | 8/2004 | Lim et al. | |
| 6,886,171 B2 | 4/2005 | MacLeod | |
| 7,191,440 B2 | 3/2007 | Cota-Robles et al. | |
| 7,660,912 B2 * | 2/2010 | Gregg ........................ 710/5 | |
| 2006/0075146 A1 | 4/2006 | Schoinas et al. | |
| 2006/0190685 A1 | 8/2006 | Arndt et al. | |
| 2006/0277348 A1 | 12/2006 | Wooten | |
| 2008/0092148 A1 | 4/2008 | Moertl et al. | |
| 2009/0144508 A1 | 6/2009 | Freimuth et al. | |

* cited by examiner

*Primary Examiner*—Jack A Lane
(74) *Attorney, Agent, or Firm*—Lawrence J. Merkel; Meyertons, Hood, Kivlin, Kowert & Goetzel, P.C.

(57) ABSTRACT

In one embodiment, a system comprises one or more input/output (I/O) devices; an I/O memory management unit (IOMMU) coupled to receive memory requests sourced by the I/O devices and configured to provide address translation for the memory requests; and a virtual machine monitor (VMM) configured to manage one or more virtual machines on the system, wherein the VMM is configured to virtualize the IOMMU, providing one or more virtual IOMMUs for use by one or more virtual machines.

13 Claims, 7 Drawing Sheets

| Specific Int Ctls | IntTablePtr[51:6] | IG | IntTableLen [3:0] | IV |
|---|---|---|---|---|

| SysMgt [1:0] | IoCtl [1:0] | DomainID [15:0] | PageTablePtr [51:12] | Mode[2:0] | TV | V |
|---|---|---|---|---|---|---|

VIRTUALIZING AN IOMMU

This application is a continuation of U.S. patent application Ser. No. 11/623,626, filed Jan. 16, 2007, now U.S. Pat. No. 7,613,898 which claims benefit of priority to U.S. Provisional Patent Application Ser. No. 60/759,826, filed on Jan. 17, 2006.

BACKGROUND

1. Field of the Invention

This invention is related to the field of computer systems, and more particularly memory management mechanisms for input/output (I/O) device-initiated requests.

2. Description of the Related Art

Computer systems of various types are ubiquitous in modern society, including personal computers (PCs), workstations, servers, various personal digital assistant (PDA) devices, etc. Most, if not all, of these computer systems have implemented memory management functionality for processor accesses to memory. Generally, the memory management functionality has included translating addresses from a virtual address space used by each process to a physical address space that spans the actual system memory, along with various memory protections (e.g. read only, read/write, privilege level requirements, etc.). The memory management functionality has a variety of uses: protecting the memory used by each process from unauthorized access by other processes; permitting large virtual spaces to be used by processes even if the physical memory system is not that large; relocation of virtual addresses to available physical memory without the participation of the process; etc.

While the processor addresses are frequently translated, addresses used by input/output (I/O) devices in computer systems are generally not translated. That is, the I/O devices use physical addresses to access memory. In a single operating system (OS) computer system, such as most PCs, the OS controls access to the I/O devices by other processes (applications and OS services). Accordingly, the OS can control which process has access to a given device at any given point in time, and can at least somewhat control the addresses accessed by the device. However, such mechanisms become more complicated and cumbersome in virtual machine systems, which may have multiple guest OSs running on a virtual machine monitor. Additionally, devices' use of physical addresses reduces the overall security of the system, since a rogue device (or a device programmed by a malicious software agent) can access memory unimpeded.

Even if translation were implemented for I/O devices, it is often not possible to efficiently virtualize the I/O activity. Unlike processor activity, which can be intercepted in flight and restarted (e.g. via page faults), I/O activity can generally not be intercepted in flight and restarted.

SUMMARY

In one embodiment, a system comprises one or more input/output (I/O) devices; an I/O memory management unit (IOMMU) coupled to receive memory requests sourced by the I/O devices and configured to provide address translation for the memory requests; and a virtual machine monitor (VMM) configured to manage one or more virtual machines on the system, wherein the VMM is configured to virtualize the IOMMU, providing one or more virtual IOMMUs for use by one or more virtual machines.

In another embodiment, an IOMMU comprises control logic configured to implement address translation for I/O device-initiated memory requests; and memory coupled to the control logic and configured to store translation data for performing the translations. The translation data corresponds to one or more I/O translation tables stored in a main memory system of a computer system that includes the IOMMU. The control logic, in response to a read request for a capabilities block, is configured to return data defined in the capabilities block for the IOMMU, wherein the capabilities block includes an indication of whether or not the IOMMU is configured to cache not-present translation table entries. The indication is useable to virtualize the IOMMU by changing, in a virtual machine monitor, the indication as returned by the control logic to a state indicating that the IOMMU does cache not-present translation table entries.

In an embodiment, a method comprises managing one or more virtual machines on a system that includes one or more input/output (I/O) devices and an I/O memory management unit (IOMMU) configured to provide address translation for memory requests issued by the I/O devices; and virtualizing the IOMMU, providing one or more virtual IOMMUs for use by one or more virtual machines.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

IOMMU Overview

Figure 1:
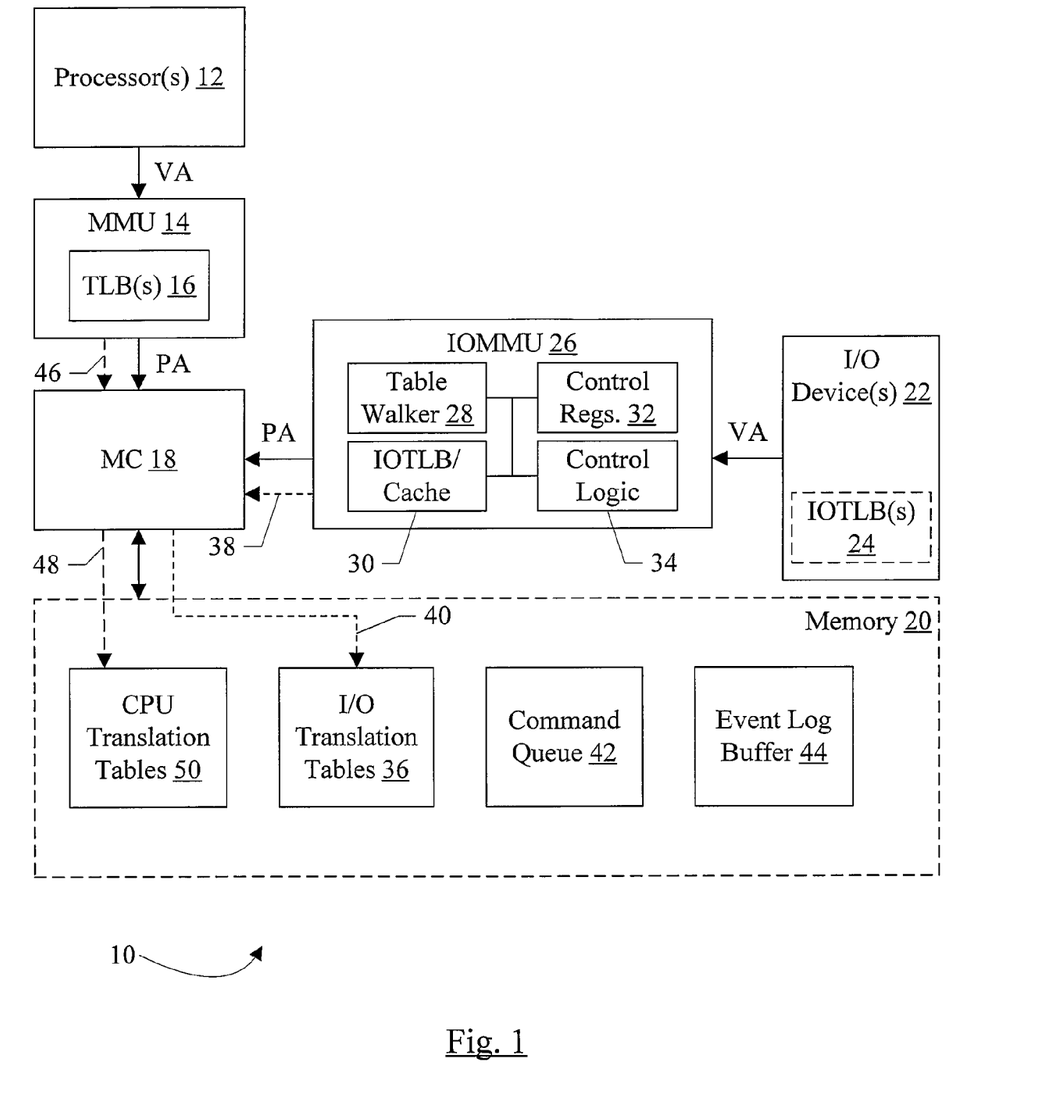
FIG. 1 is a block diagram of a high level view of one embodiment of a computer system.

FIG. 1 is a block diagram illustrating a simplified, high level view of one embodiment of a computer system 10. In the illustrated embodiment, the system 10 includes one or more processors 12, a memory management unit 14 comprising one or more translation lookaside buffers (TLBs) 16, a memory controller (MC) 18, a memory 20, one or more I/O devices 22 which may comprise one or more I/O TLBs (IOTLBs) 24, and an I/O MMU (IOMMU) 26 which may comprise a table walker 28, an IOTLB/cache 30, control registers 32, and control logic 34. The processors 12 are coupled to the MMU 14, which is coupled to the memory controller 18. The I/O devices 22 are coupled to the IOMMU 26, which is coupled to the memory controller 18. Within the IOMMU 26, the table walker 28, the IOTLB 30, the control registers 32, and the control unit 34 are coupled.

As illustrated in FIG. 1, the path from the I/O devices 22 to the memory 20 is at least partially separate from the path of the processors 12 to the memory 20. Specifically, the path from the I/O devices 22 to memory 20 does not pass through the MMU 14. Accordingly, the MMU 14 may not provide memory management for the memory requests sourced from the I/O devices 22. Generally, memory management may comprise address translation from a virtual address (VA in FIG. 1) to a physical address (PA in FIG. 1) and memory protection. Memory protection may control read and/or write access to the memory at some level of granularity (e.g. a page), along with various other attributes such as privilege level requirements, cacheability and cache controls (e.g. writethrough or writeback), coherency, etc. Any set of memory protections may be implemented in various embodiments. In some embodiments, the memory protections implemented by the IOMMU 26 may differ from the memory protections implemented by the MMU 14, in at least some respects. In one embodiment, the memory protections implemented by the IOMMU 26 may be defined so that the translation tables storing the translation data used by the IOMMU 26 and the MMU 14 may be shared (although shown separately in FIG. 1 for ease of discussion). Other embodiments may not share translation tables between the IOMMU 26 and the MMU 14, as desired.

Generally, the I/O devices 22 may be configured to issue memory requests, such as memory read and write requests, to access memory locations in the memory 20. The memory requests may be part of a direct memory access (DMA) read or write operation, for example. The DMA operations may be initiated by software executed by the processors 12, programming the I/O devices 22 directly or indirectly to perform the DMA operations. Among other things, the I/O devices 22 may be provided with virtual addresses to access the memory 20. The virtual addresses may be translated by the IOMMU 26 to corresponding physical addresses to access the memory, and the physical addresses may be provided to the memory controller 18 for access. That is, the IOMMU 26 may modify the memory requests sourced by the I/O devices 22 to change the virtual address in the request to a physical address, and the memory request may be forwarded to the memory controller 18 to access the memory 20.

The IOMMU uses a set of I/O translation tables 36 stored in the memory 20 to translate the addresses of memory requests from the I/O devices 22. Generally, translation tables may be tables of translation data that can be used to translate virtual addresses to physical addresses. The translation tables may store the translation data in any fashion. For example, in one embodiment, the I/O translation tables 36 may include page tables similar to those defined in the x86 and AMD64™ instruction set architectures. Various subsets of the virtual address bits may be used to index levels of the table, and each level may either be the end of translation (i.e. storing a real page number for the translation) or may point to another table (indexed by another set of virtual address bits). The page may be the unit of translation (i.e. each address in the virtual page translates to the same physical page). Pages may have varying sizes, from 4 kilobytes up to Megabytes or even Gigabytes.

Additionally, the translation tables 36 may include a device table that maps devices to sets of page tables (e.g. by device identifier). The device identifier (ID) may be defined in a variety of ways, and may be dependent on the peripheral interconnect to which the device is attached. For example, Peripheral Component Interconnect (PCI) devices may form a device identifier from the bus number, device number and function number. HyperTransport™ (HT) devices may use a bus number and unit ID to form a device identifier. The device table may include a plurality of entries indexed by the device ID, and each entry may include a pointer to a set of page tables used by the device having the corresponding device ID. In some embodiments, the device table may also include a pointer to an interrupt remapping table to remap the device's interrupts. Thus, in general, a translation from a virtual address to a physical address may be stored in one or more entries in one or more translation tables, and some of the entries may be shared with other translations. Traversing the tables from entry to entry may be part of identifying the translation for the virtual address. In one embodiment, the translation tables 36 may include the interrupt remapping table mentioned above.

Specifically, the IOMMU 26 illustrated in FIG. 1 may include the table walker 28 to search the I/O translation tables 36 for a translation for a given memory request. The table walker 28 may generate memory requests, e.g. read memory requests, to read the translation data from the translation tables 36. The translation table reads are illustrated by dotted arrows 38 and 40 in FIG. 1.

To facilitate more rapid translations, the IOMMU 26 may cache some translation data. For example, the IOTLB 30 may be a form of cache, which caches the result of previous translations, mapping virtual page numbers to real page numbers and corresponding translation data. If a translation is not found in the IOTLB 30 for the given memory request, the table walker 28 may be invoked. In various embodiments, the table walker 28 may be implemented in hardware, or in a microcontroller or other processor and corresponding executable code (e.g. in a read-only memory (ROM) in the IOMMU 26). Additionally, other caches may be included to cache page tables, or portions thereof, and/or device tables, or portions thereof, as part of IOTLB/cache 30. Accordingly, the IOMMU 26 may include one or more memories to store translation data that is read from, or derived from, translation data stored in the memory 20.

The control logic 34 may be configured to access the IOTLB 30 to detect a hit/miss of the translation for a given memory request, and may invoke the table walker. The control logic 34 may also be configured to modify the memory request from the I/O device with the translated address, and to forward the request upstream toward the memory controller. Additionally, the control logic 34 may control various functionality in the IOMMU 26 as programmed into the control registers 32. For example, the control registers 32 may define an area of memory to be a command queue 42 for memory management software to communicate control commands to the IOMMU 26, in this embodiment. The control logic 34 may be configured to read the control commands from the command queue 42 and execute the control commands. Similarly, the control registers 32 may define another area of memory to be an event log buffer 44. The control logic 34 may detect various events and write them to the event log buffer 44. The events may include various errors detected by the control logic 34 with respect to translations and/or other functions of the IOMMU 26. The control logic 34 may also implement other features of the IOMMU 26.

The I/O devices 22 may comprise any devices that communicate between the computer system 10 and other devices, provide human interface to the computer system 10, provide storage (e.g. disk drives, compact disc (CD) or digital video disc (DVD) drives, solid state storage, etc.), and/or provide enhanced functionality to the computer system 10. For example, the I/O devices 22 may comprise one or more of: network interface cards, integrated network interface functionality, modems, video accelerators, audio cards or integrated audio hardware, hard or floppy disk drives or drive controllers, hardware interfacing to user input devices such as keyboard, mouse, tablet, etc., video controllers for video displays, printer interface hardware, bridges to one or more peripheral interfaces such as PCI, PCI express (PCIe), PCI-X, USB, firewire, SCSI (Small Computer Systems Interface), etc., sound cards, and a variety of data acquisition cards such as GPIB or field bus interface cards, etc. The term "peripheral device" may also be used to describe some I/O devices.

In some cases, one or more of the I/O devices 22 may also comprise an IOTLB, such as IOTLBs 24. These IOTLBs may be referred to as "remote IOTLBs", since they are external to the IOMMU 26. In such cases, the memory requests that have already been translated may be marked in some fashion so that the IOMMU 26 does not attempt to translate the memory request again.

The memory controller 18 may comprise any circuitry designed to interface between the memory 20 and the rest of the system 10. The memory 20 may comprise any semiconductor memory, such as one or more RAMBUS DRAMs (RDRAMs), synchronous DRAMs (SDRAMs), DDR SDRAM, static RAM, etc. The memory 20 may be distributed in a system, and thus there may be multiple memory controllers 18.

The MMU 14 may comprise a memory management unit for memory requests sourced by a processor 12. The MMU may include TLBs 16, as well as table walk functionality. When a translation is performed by the MMU 14, the MMU 14 may generate translation memory requests (e.g. shown as dotted arrows 46 and 48 in FIG. 1) to the CPU translation tables 50. The CPU translation tables 50 may store translation data as defined in the instruction set architecture implemented by the processors 12.

The processors 12 may comprise any processor hardware, implementing any desired instruction set architecture. In one embodiment, the processors 12 implement the x86 architecture, and more particularly the AMD64™ architecture. Various embodiments may be superpipelined and/or superscalar. Embodiments including more than one processor 12 may be implemented discretely, or as chip multiprocessors (CMP) and/or chip multithreaded (CMT).

The system 10 illustrates high level functionality of the system, and the actual physical implementation may take many forms. For example, the MMU 14 is commonly integrated into each processor 12. While a memory 20 is shown, the memory system may be a distributed memory system, in some embodiments, in which the memory address space is mapped to multiple, physically separate memories coupled to physically separate memory controllers. The IOMMU may be placed anywhere along the path between I/O-sourced memory requests and the memory 20, and there may be more than one IOMMU. Still further, IOMMUs may be located at different points in different parts of the system.

Figure 2:
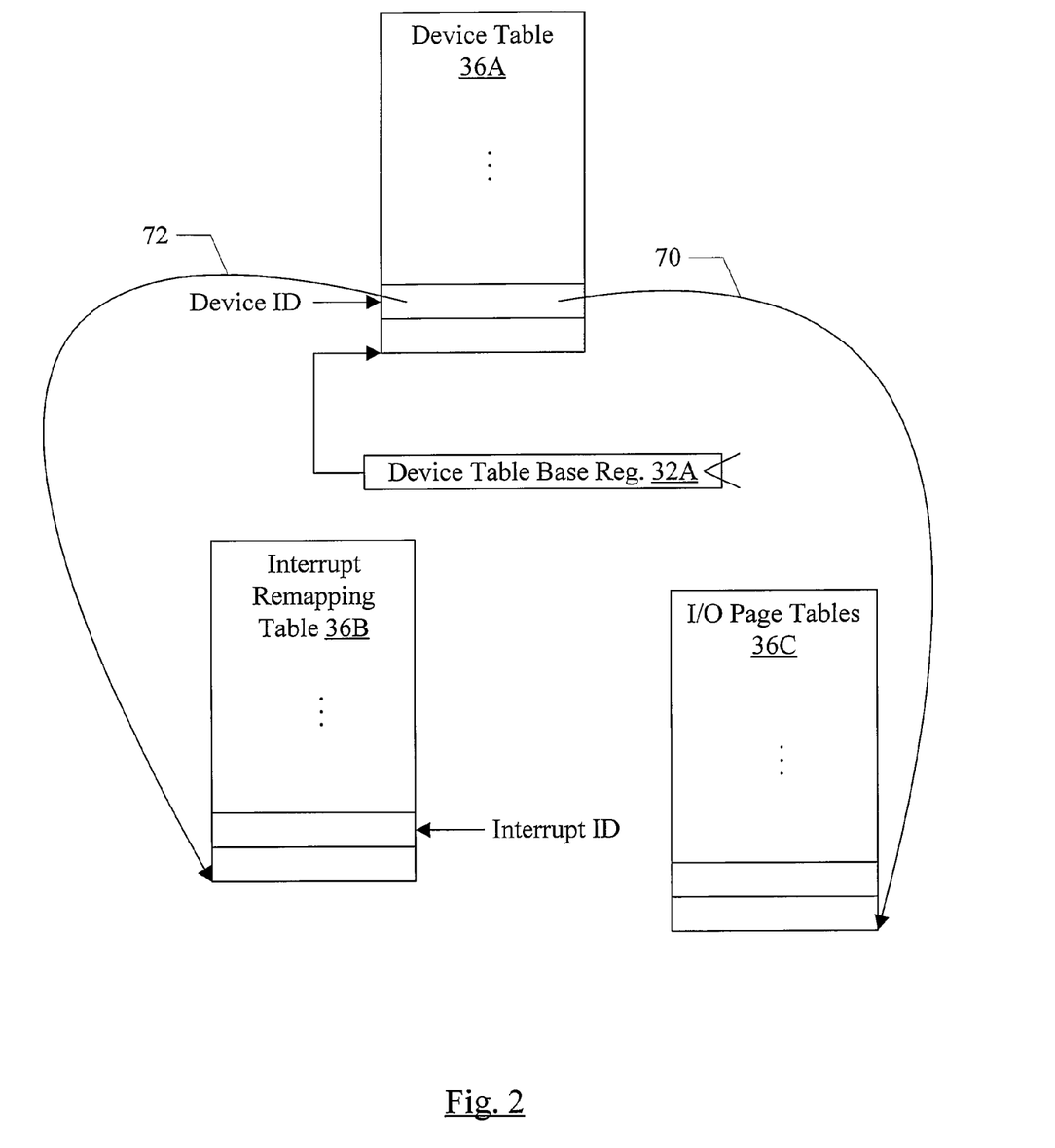
FIG. 2 is a block diagram of one embodiment of a set of I/O translation tables.

Turning now to FIG. 2, a block diagram is shown illustrating one embodiment of the I/O translation tables 36. Specifically, the translation tables 36 may include a device table 36A, an interrupt remapping table 36B, and a set of I/O page tables 36C. Also shown in FIG. 2 is one of the control registers 32 (control register 32A). The control register 32A may store a base address of the device table 36A.

Figure 3:
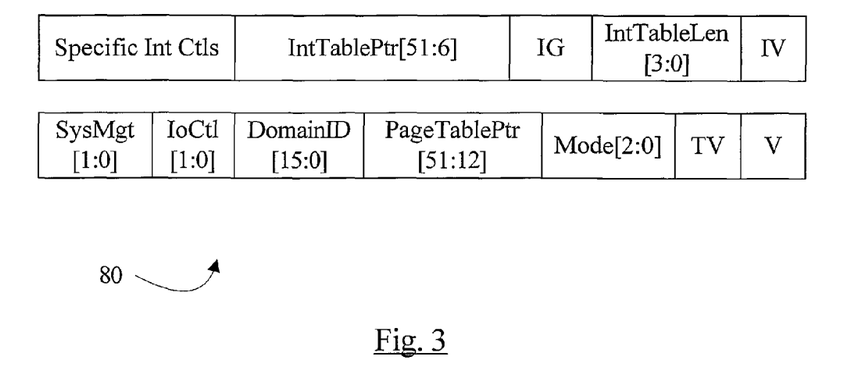
FIG. 3 is a block diagram of one embodiment of a device table entry for a device table shown in FIG. 2.

The device table 36A includes a plurality of entries, indexed by a device ID assigned to the device. Thus, a given device corresponds to one of the entries in the device table 36A (unless the device has multiple device IDs, or unless the device has its traffic aggregated with others at a bridge device, and the traffic is transmitted under the bridge's device ID). The device table entry may include a variety of data. An exemplary entry is shown in FIG. 3 and described in more detail below.

Specifically, the entry may include a pointer to the I/O page tables 36C (represented by arrow 70). The pointer to the I/O page tables 36C may point to a page table that is the starting point for translation searching in the page tables 36C. The starting page table may include pointers to other page tables, in a hierarchical fashion, as mentioned above. The page tables may be indexed by various bits of the virtual address to be translated, according to the implemented translation process.

The entry may also include a pointer to the interrupt remapping table 36B (represented by arrow 72). The interrupt remapping data may be used when an interrupt request is transmitted by a device, and may be indexed by an interrupt ID. The interrupt ID may comprise data that identifies the requested interrupt, and may vary based on the mechanism used to transmit the interrupt request. For example, PCIe defines message signalled interrupts (MSIs), and the interrupt is specified via the MSI data. The MSI data may comprise the interrupt ID. In HT, portions of the address specify the interrupt. The specification information may comprise, e.g., destination (e.g. processor) and vector on that processor. In some embodiments, some or all of the data forming the interrupt ID may be explicitly included in the interrupt request. In other embodiments, some or all of the data may be implicit in the interrupt request (e.g. based on the type of interrupt request, the specific interrupt requested, etc.). In still other embodiments, a combination of explicit and implicit data may be used.

It is noted that, while one device table 36A is shown, multiple device tables may be maintained if desired. The device table base address in the control register 32A may be changed to point to other device tables. Furthermore, device tables may be hierarchical, if desired, similar to the page tables described above. Similarly, while one interrupt remapping table 36B is shown, there may be multiple interrupt mapping tables, e.g. up to one per entry in the device table 36A. There may also be multiple sets of page tables, e.g. up to one per entry in the device table 36A. It is noted that other embodiments may implement interrupt remapping without I/O translation, and may implement I/O translation without interrupt remapping.

Turning now to FIG. 3, a block diagram of one embodiment of a device table entry 80 is shown. Other embodiments may implement supersets of the fields and other fields, subsets of the fields, or subsets in combination with other fields, as desired. The fields shown in FIG. 3 may be related to interrupt remapping and/or address translation, and other fields may be provided for other purposes in various embodiments. A field may comprise one or more bits, the encoding of which are assigned particular meanings when interpreted by the IOMMU 26. If a field is a single bit, for this embodiment, it is referred to as a bit. However, multibit fields for similar purposes may be used in other embodiments. Multibit fields are shown with bit ranges in FIG. 3, for this embodiment.

Various specific interrupt control bits may be provided in the specific interrupt control field to control whether certain specific interrupts are blocked or passed unmodified. For example, there may be control bits for legacy programmable interrupt controller (PIC) interrupt requests (Lint1 and Lint0), non-maskable interrupt (NMI), external interrupt, INIT interrupt, and or system management interrupt (SMI). Additionally, the specific interrupt control field may include a field to control how fixed and arbitrated interrupt messages are handled by the IOMMU 26. Encodings of this field may be used to specify that such interrupts are blocked, remapped using the interrupt remapping table, or forwarded unmodified, in one embodiment.

The interrupt table pointer field (IntTablePtr) may store the base address of an interrupt remapping table mentioned above. The interrupt table length (IntTableLen) specifies the extent of the interrupt table. The interrupt table length field may be encoded for several possible lengths (e.g. 1-2048 entries in powers of two, for one embodiment). The IG bit may be used to indicate whether or not event log entries in the event log buffer 44 are to be created if an I/O page fault is detected for an interrupt message. The interrupt valid (IV) bit may indicate whether or not the interrupt-related fields are valid. If the fields are not valid, the IOMMU 26 may pass all interrupts unmodified.

The SysMgt field may be encoded to provide further control of communications in the system management range. Specifically, in one embodiment, the SysMgt field may be encoded to: block requests in the range; forward requests in the range unmodified (posted writes only); forward requests that map to INTx messages unmodified (posted writes only); or translate requests using the I/O page tables. The IoCtl field may be encoded to provide further control of communications in the I/O space range. Specifically, in one embodiment, the IoCtl field may be encoded to: block requests in the range; forward the requests unmodified; or translate the requests using the I/O page tables.

The Domain ID is used to tag IOTLB entries and any other cache entries in the IOMMU 26 so that different devices differentiate their translation data. If devices share translation tables, they may have the same Domain ID to share cache/IOTLB entries. The Domain ID is completely under the control of software, and thus may permit flexibility for controlling software (e.g. a virtual machine monitor, or an operating system in non-virtual machine implementations) to group I/O devices into a domain to share translation data, or to separate the devices. For example, devices assigned to a given virtual machine may have the same Domain ID, and different Domain IDs may be used for different virtual machines. Any combination of separated devices and grouped devices may thus be created.

The page table pointer (PageTablePtr) is the pointer to the I/O page tables to be used by devices that access the device table entry 80. The mode field (Mode) may be coded to indicate the mode of translation. Specifically, an encoding of this field may indicate that translation is disabled (e.g. all binary zeros). Other encodings may indicate the level in the page table hierarchy at which translation is to begin for requests mapped to this entry. The TV bit indicates whether or not the page translation data are valid, and the V bit indicates if the entry 80 is valid.

Figure 4:
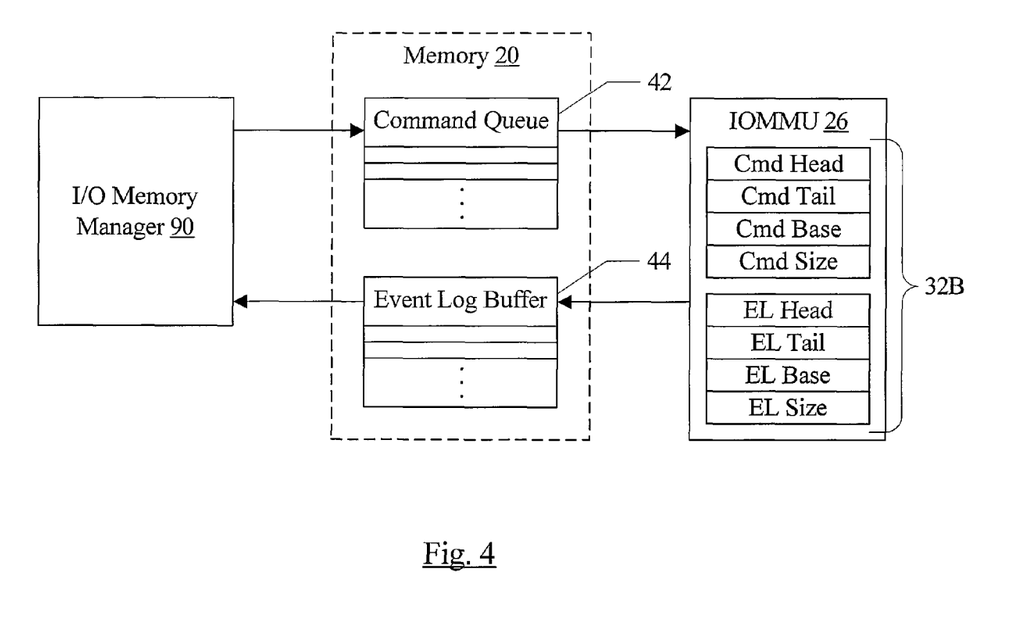
FIG. 4 is a block diagram of one embodiment of a communication mechanism between the IOMMU and software.

Turning next to FIG. 4, a block diagram is shown illustrating one embodiment of a communication mechanism between the IOMMU 26 and an I/O memory manager 90. The memory 20 is also shown, including the command queue 42 and event log buffer 44 illustrated in FIG. 1. A number of control registers 32B, part of the control registers 32, are shown in FIG. 4 as well. The control registers 32B may be programmed to locate the command queue 42 and the event log buffer 44 in the memory 20. The IOMMU 26 (and more particularly the control logic 34) and/or the I/O memory manager 90 may update the control registers 32B as the command queue 42 and/or the event log buffer 44 are updated. In the present embodiment, the command queue 42 and the event log buffer 44 may both be circular buffers. When the last entry in the queue/buffer is read/written, the pointer wraps around to the first entry for the next read/write.

Specifically, the control registers 32B include head and tail pointers for the command queue 42 (Cmd Head and Cmd Tail), and a base address and size of the command queue (Cmd Base and Cmd Size). The base and size define the extent of the queue, and the head and tail pointers identify the next command to be executed and the last command added, respectively, in the command queue 42. The I/O memory manager 90 may add commands to the command queue 42 beginning at the tail pointer, then update the tail pointer to inform the IOMMU 26 of the commands. The IOMMU 26 may read commands from the entry indicated by the head pointer, and may update the head pointer to point to the next entry in the command queue 42. Similarly, the control registers 32B include head and tail pointers for the event log buffer 44 (EL Head and EL Tail) and a base address and size of the event log buffer 44 (EL Base and EL Size). The IOMMU 26 may write detected events to the event log buffer 44 beginning at the tail pointer, then update the tail pointer to reflect the added entries. The I/O memory manager 90 may read the events from the event log buffer 44 using the head pointer.

The I/O memory manager 90 may be a memory management module, or may be part of a memory management module that also handles memory management for the processor. In virtualized cases, the I/O memory manager 90 may be included in the virtual machine monitor (VMM). Alternatively, the I/O memory manager 90 may be part of the OS or other software in the virtual machine, and the IOMMU 26 may be the virtual IOMMU provided to the virtual machine. The memory management module may comprise instructions which, when executed, manage the allocation of memory pages to processor and/or I/O virtual addresses. The memory management module may update the translation tables in memory to reflect the translations created by the memory management module and to delete translations for virtual pages that have been unmapped from the corresponding physical pages. The memory management module may be executed on one or more processors 12 in the computer system 10.

The I/O memory manager 90 may control the IOMMU 26 using control commands. Specifically, the I/O memory manager 90 may write control commands to the command queue 42 in the memory 20. The I/O memory manager 90 may use the command queue 42 to send a batch of two or more control commands to the IOMMU 26, while still permitting the IOMMU 26 to read the control commands and process them at its own pace. Similarly, the IOMMU 26 may be configured to detect various events during operation, and may inform the I/O memory manager 90 of the events in the event log buffer 44. The I/O memory manager 90 may process the events as desired.

The control commands may include one or more invalidation commands. Since the I/O memory manager 90 updates the I/O translation tables 36, and it is possible that the updated translation data is cached in the IOMMU 26 (including any IOTLBs that may be downstream from the IOMMU 26), the I/O memory manager 90 may use the invalidation commands to ensure that stale translation data has been invalidated from the IOMMU 26. The invalidate commands may include an invalidate pages command to invalidate I/O page table entries, an invalidate device table command to invalidate device table entries, and an invalidate IOTLB command to invalidate IOTLBs (either local to the IOMMU or remote IOTLBs in devices). Additionally, the control commands may include a completion wait command. The completion wait command may be used to ensure that preceding commands have been completed prior to the completion of the completion wait command. Thus, the completion wait command may be used by the I/O memory manager 90 to synchronize the completion of a batch of commands. Once the completion wait command has completed, the I/O memory manager 90 knows that the preceding invalidations have been completed and there are no in-flight memory operations that have been translated using the invalidated translation data. Accordingly, the I/O memory manager 90 may invalidate a translation or translations in the I/O translation tables 36 by marking the entries invalid (or "not present"), and then write one or more invalidation commands specifying the entries to be invalidated in the command queue 42, followed by a completion wait command.

It is noted that the I/O memory manager may comprise any instruction sequence(s) that implement the interface to the IOMMU 26 and manage the translation data for the IOMMU 26 (or a virtualization thereof). For example, the I/O memory manager 90 may be included in a virtual machine manager, and operating system, and/or separate code.

Virtualizing the IOMMU

The IOMMU 26 may include various features to simplify virtualization of the IOMMU, providing virtual IOMMUs for each virtual machine on the system 10. Various embodiments may implement one or more of these features, in any desired combination. The features are described for one embodiment below. The description below will refer to a virtual machine monitor (VMM) that manages the virtual machines (scheduling their execution on the underlying hardware), controls access to various system resources, etc. VMMs are also sometimes referred to as hypervisors.

Figure 5:
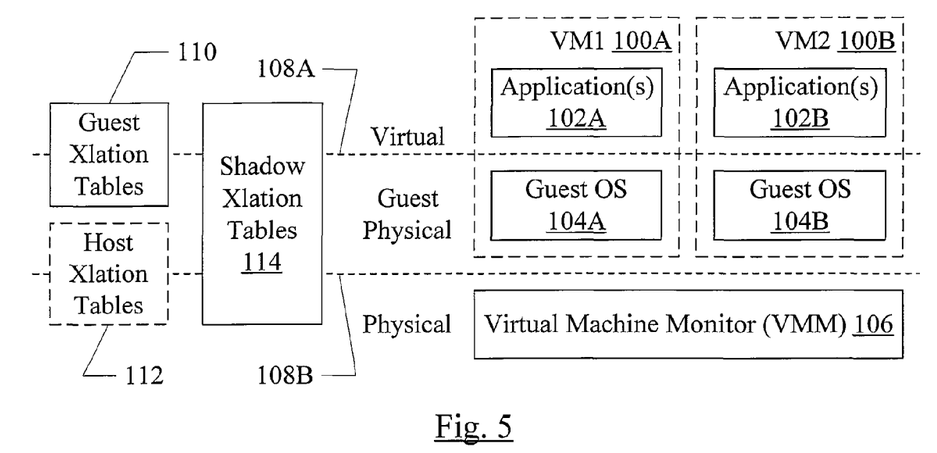
FIG. 5 is a block diagram of one embodiment of virtual machines and a virtual machine monitor (VMM).

FIG. 5 is a block diagram illustrating one embodiment of the components of virtual machines and a VMM, and various memory spaces that may be associated with the components and VMM. In the illustrated embodiment, two virtual machines 100A and 100B are shown. The number of virtual machines in a given embodiment may vary from one to more than two, and may dynamically change during use as virtual machines are started and stopped by a user. The virtual machine 100A includes one or more applications 102A and an operating system (OS) 104A. The OS 104A is a "guest OS", since the OS 104A controls the virtual machine created for it by the VMM 106, rather than the physical hardware of the system 10. Similarly, the virtual machine 100B includes one or more applications 102B and a guest OS 104B.

FIG. 5 also illustrates various address spaces and the access to those address spaces by various components shown in FIG. 5. Horizontal dotted lines 108A-108B illustrate the logical divide of the address spaces. Generally, the applications in the virtual machines use a virtual address space. Thus, the applications 102A-102B are shown above the line 108A, which demarcates the virtual address space and the guest physical address space. Virtual address spaces for different applications may be separate (or separation/sharing of virtual address spaces may be managed at a different granularity such as the process level or the thread level).

The guest OS in each virtual machine may manage mappings of the virtual addresses to "physical" addresses in the virtual machine. If the guest OS were running directly on the system 10 hardware, with no VMM, the physical addresses generated by the guest OS would indeed be the physical addresses of the memory locations in the system 10. However, in the virtual machine environment, the VMM 106 may manage the mappings to physical addresses. Thus, the guest OS manages mappings of virtual addresses to "guest physical" addresses (which are further mapped to physical addresses by the VMM 106). Accordingly, the guest OSs 104A-104B are shown as using the guest physical space between lines 108A-108B. The guest OSs 104A-140B manage the mappings from virtual addresses to physical addresses using the guest translation tables 110.

The VMM manages the mappings from guest physical to physical in the system 10. Logically, there may be a set of host translation tables 112 maintained by the VMM 106 to map the guest physical addresses to physical addresses. However, the host translation tables 112 may not be used by hardware and thus may have any desired construction and data structure. That is, the host translation tables 112 may be private to the VMM 106, and thus need not match the construction of other translation tables (which are generally dictated by the instruction set architecture and/or other architectural specifications such as the IOMMU architecture). The VMM also manages a set of shadow translation tables 114. The shadow translation tables 114 may map the virtual addresses directly to the physical addresses (achieving the net effect of the tables 110 and 112), and may be used by the hardware in the system 10.

The translation tables 110, 112, and 114 may each include both the CPU translation tables 50 and the I/O translation tables 36 as shown in FIG. 1 and described above. VMM 106 may maintain the shadow translation tables for the CPU translation tables 50 in various known fashions. There is some flexibility in the processor translation tables, since processor instructions which page fault due to a lack of translation in the shadow page tables 114 may generally be restarted after servicing the page fault. However, an I/O device-generated memory request may not be able to be restarted in the event of a page fault. Thus, shadow table management techniques for I/O translation tables 36 may differ from those used in the CPU translation tables 50.

Figure 6:
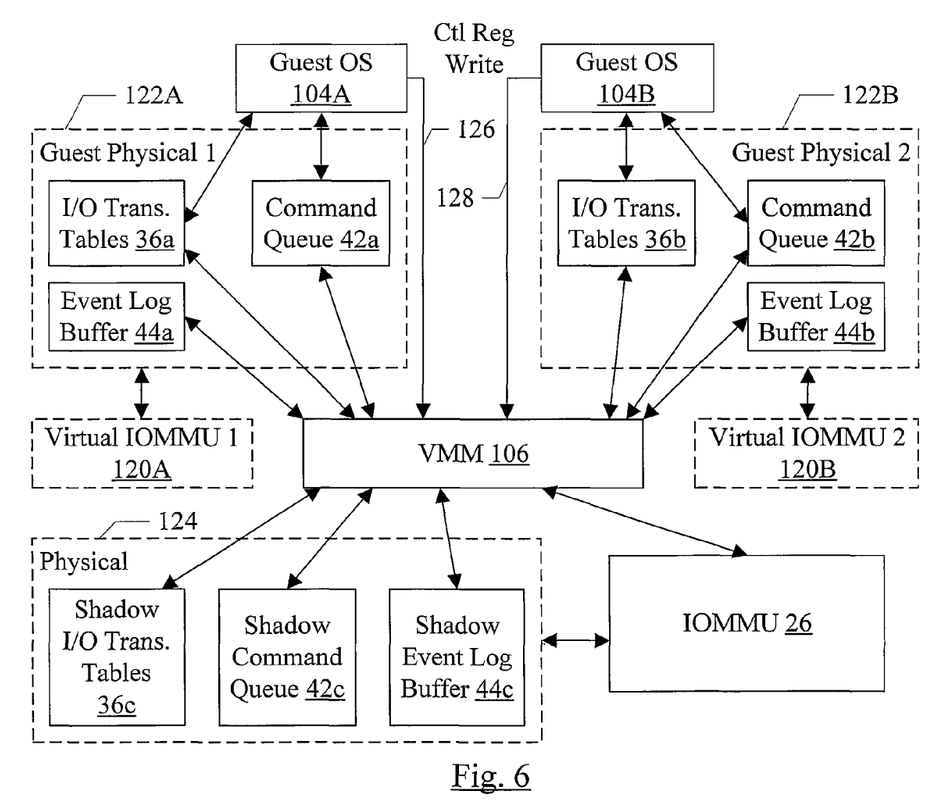
FIG. 6 is a block diagram of one embodiment of virtualizing the IOMMU.

FIG. 6 is a block diagram illustrating certain details of one embodiment of the VMM 106 virtualization of the IOMMU 26. The virtual IOMMU for each virtual machine is shown as virtual IOMMUs 120A and 120B in FIG. 6, for virtual machines 100A and 100B respectively. The guest OSs 104A-104B are shown, and various data structures maintained by the guest OSs in their respective guest physical address spaces 122A and 122B are shown. The data structures maintained by the guest OSs 104A-104B may be used to communicate with their respective virtual IOMMUs 120A-120B. Accordingly, each guest OS maintains respective I/O translation tables 36a and 36b as shown in FIG. 6 (part of the guest translation tables 110), a respective command queue 42a-42b, and a respective event log buffer 44a-44b, as described above with regard to FIG. 1. The VMM 106 may maintain shadow I/O translation tables 36c, a shadow command queue 42c, and a shadow event log buffer 44c in the physical memory space 124. The shadow data structures may be the data structures used by the physical IOMMU 26, and may be maintained by the VMM 106 on behalf of the virtual machines 100A-100B. That is, the control registers 32B in the IOMMU 26 may locate the shadow command queue 42c and the shadow event log buffer 44c, and the base address of the device table in the control register 32A may point to a device table in the shadow I/O translation tables 36c. Accordingly, the physical IOMMU 26 may be shared by the virtual machines, providing at least some of the IOMMU functionality represented by the virtual IOMMUs 120A-120B.

It is noted that, while the guest OSs are described as controlling the communication with the virtual IOMMU, other embodiments may use any form of I/O memory manager to communicate with the IOMMU, as mentioned above with regard to FIG. 4.

Features that may be implemented by various embodiments of the IOMMU 26 to simplify the virtualization of the IOMMU 26 are highlighted next. A capabilities block may be defined for the IOMMU. The capabilities block may comprise data that may be read by software to identify IOMMU features. Various features that are optional or that may be varied for different implementations may be defined in the capabilities block. The capabilities block may, e.g., be mapped to the Peripheral Component Interconnect (PCI) configuration space. Other embodiments may support capabilities block reads in other fashions (e.g. mapped to special purpose registers, other address spaces, etc.). The IOMMU capabilities block may include an indication (referred to as NPCache herein) that indicates whether or not the IOMMU can cache not-present (or invalid) translation table entries. If the IOMMU does cache such entries, an invalidate command is required for each change to the I/O translation tables. If the NPCache indication indicates that not-present entries are not cached by the IOMMU, then software managing the I/O translation tables may omit invalidate commands if the corresponding translation data is known not to be cached in the IOMMU (e.g. if the change is made to a previously not-present translation table entry).

The capabilities block corresponding to a physical IOMMU such as IOMMU 26 may generally have the NPCache indication in a state indicated that not-present entries are not cached (e.g. the NPCache indication may be a bit, and the clear state may indicate not cached). However, a VMM may intercept reads to the capabilities block issued by a virtual machine, and may change the NPCache indication to a state indicating the not-present entries may be cached (e.g. setting the NPCache bit). Thus, each change made by the guest OS 104A-104B to the I/O translation tables 36a-36b may have a corresponding invalidate command queued in the command queue 42a-42b, and thus each change may be readily detected by the VMM 106 by intercepting the invalidate commands. More specifically, in the illustrated embodiment, the VMM 106 may intercept control register write commands targeted at the virtual IOMMUs (and more particularly the control registers 32B shown in FIG. 4). Intercepting of the control register writes is represented in FIG. 6 via arrows 126 and 128. The VMM may use the invalidate commands to identify which translation table entries have been changed, and thus maintain shadow I/O translation tables 36c for use by the physical IOMMU 26. Furthermore, the use of an in-memory command queue 42 may permit the virtual machines to make multiple changes (queuing invalidate commands for each change in the command queues 42a-42b). The virtual machines may generate one control register write that may be intercepted and the changes may be processed in one intercept. Processing multiple changes in one intercept may be more efficient. Alternatively or in addition to the above, the I/O translation tables 36a-36b may be write protected by the VMM 106 and the VMM 106 may detect updates via the page faults that occur when the virtual machines attempt to update the I/O translation tables 36a-36b.

The VMM 106 may also read the shadow event log buffer 44c, and may make corresponding event log buffer entries in the event log buffer 44a-44b of the virtual machine to which each given event applies.

The domain ID in the device table may also aid in virtualization. Each device that is assigned to a given virtual machine may be assigned to the same domain, and thus may share I/O translation table entries. Devices assigned to different virtual machines may be assigned to different domains. Furthermore, the domain IDs used by the VMM 106 may differ from those used by the guest OSs, which may provide additional security.

Figure 7:
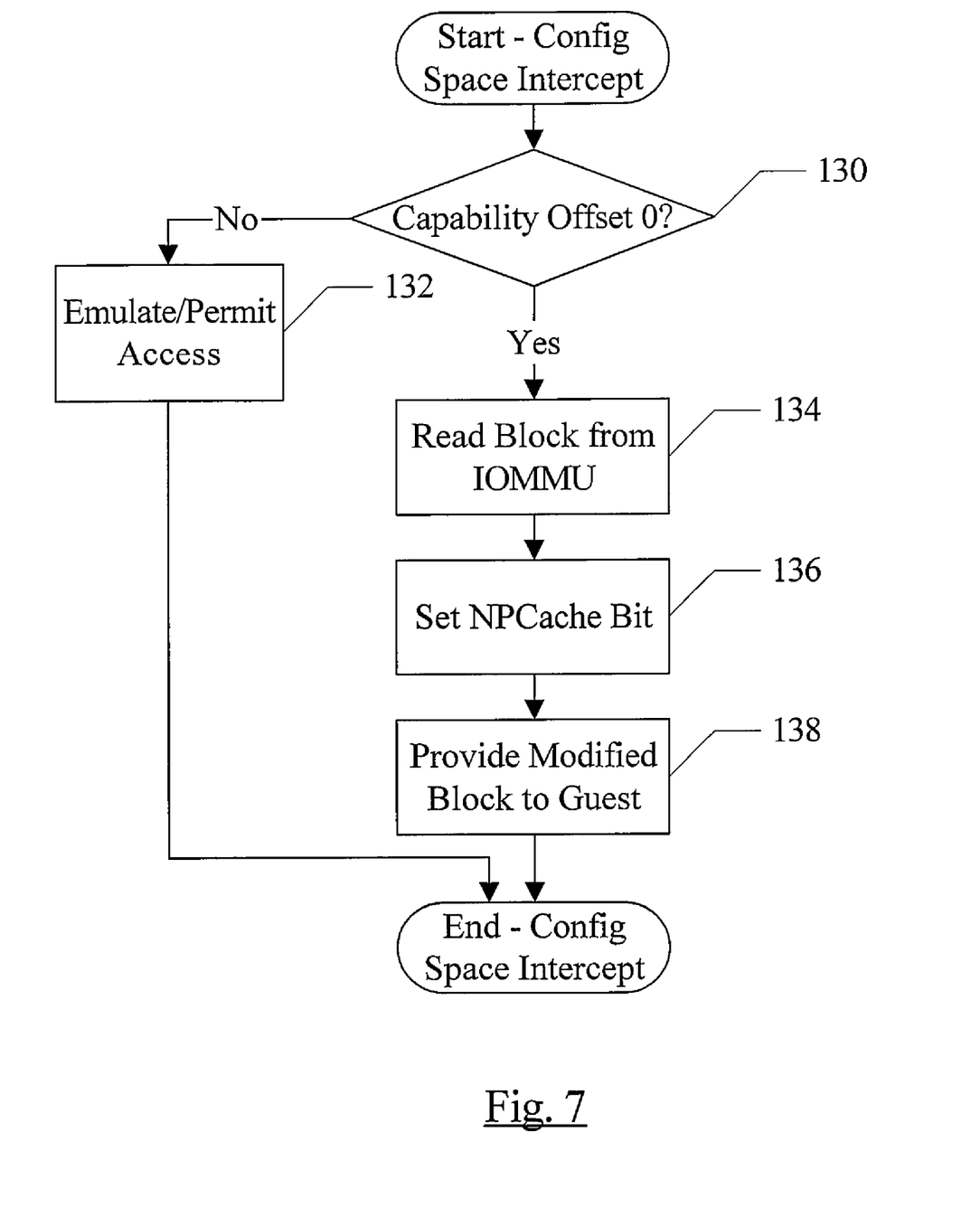
FIG. 7 is a flowchart illustrating operation of one embodiment of a VMM intercepting a PCI configuration space access.

Turning now to FIG. 7, a flowchart is shown illustrating operation of one embodiment of the VMM 106 in response to intercepting a PCI configuration space read. The VMM 106 may comprise instructions which, when executed, implement the operations illustrated in the flowchart of FIG. 7. While the blocks are shown in a particular order for ease of understanding, other orders may be used.

If the intercepted read is not for the IOMMU capability block, offset 0 (decision block 130, "no" leg), the VMM 106 may emulate the access or permit the access, as appropriate (block 132). In the present embodiment, the NPCache indication is in the IOMMU capability block, at offset 0. Other embodiments may place the indication at other offsets, and the VMM 106 may monitor for reads to such offsets. In one embodiment, the offsets are measured in units of 4 bytes (32 bits), which may be the size of an I/O configuration space read. Other embodiments may implement larger or smaller sized I/O space reads, and the offsets may be measured in units of the implemented size.

If the intercepted read is for the IOMMU capability block, offset 0 (decision block 130, "yes" leg), the VMM 106 may read the capability block, offset 0 from the IOMMU 26 (block 134). The VMM 106 may set the NPCache bit in the data returned from the IOMMU 26 (block 136), and may provide the modified block data to the guest from which the read was intercepted (block 138). Other modifications to the capability block data may be made, in various embodiments, as desired. It is noted that, in some embodiments, the NPCache bit may already be set (indicating that not-present entries may be cached, in this embodiment). The VMM 106 may set the NPCache bit independent of the underlying physical IOMMU's properties, to ensure that invalidate commands are queued in the command queues 42a-42b for each change to the I/O translation tables 36a-36b, respectively.

Figure 8:
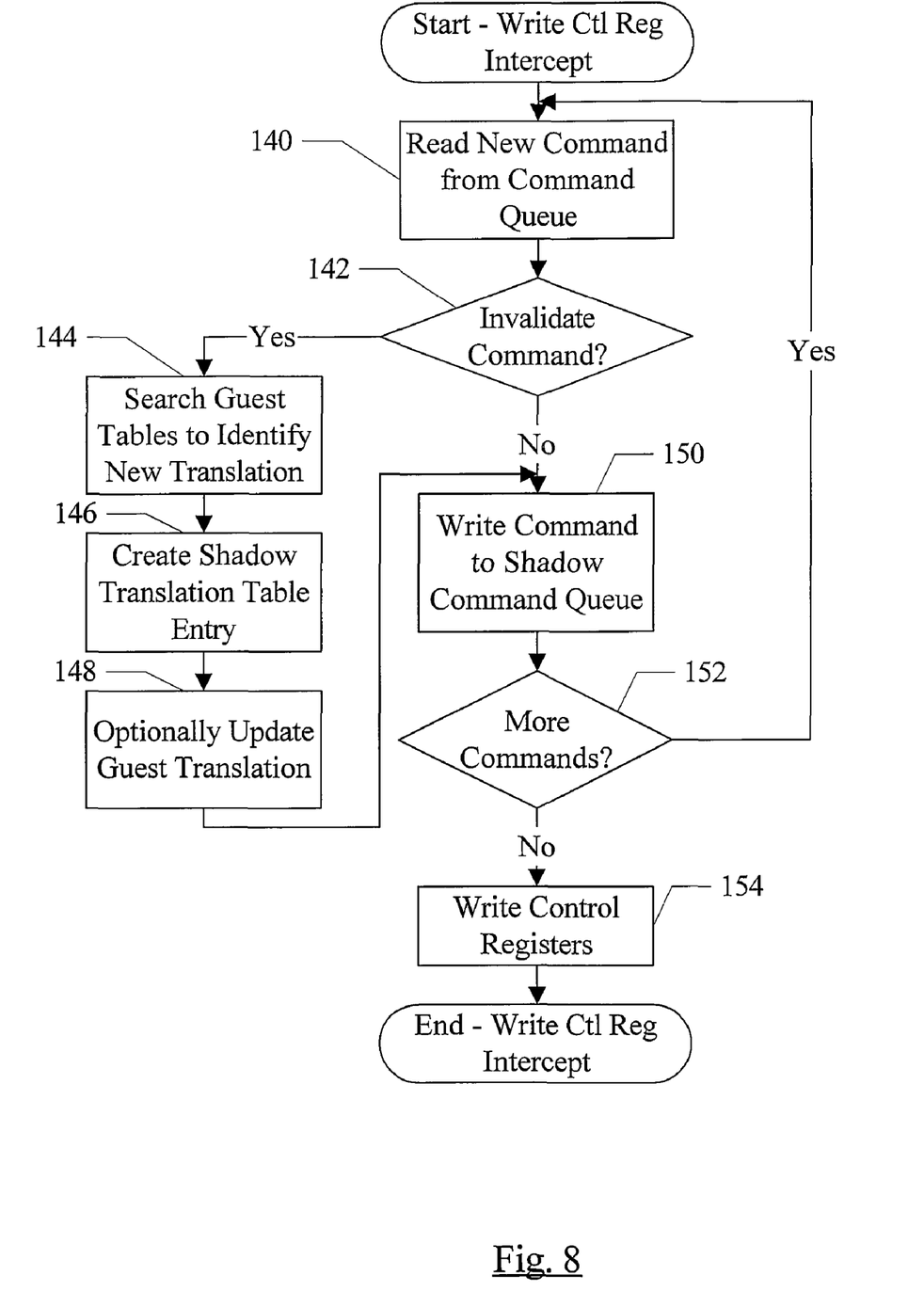
FIG. 8 is a flowchart illustrating operation of one embodiment of a VMM intercepting a write to a control register in the IOMMU.

Turning now to FIG. 8, a flowchart is shown illustrating operation of one embodiment of the VMM 106 in response to intercepting a control register write from a virtual machine. The VMM 106 may comprise instructions which, when executed, implement the operations illustrated in the flowchart of FIG. 8. While the blocks are shown in a particular order for ease of understanding, other orders may be used.

The VMM 106 may read a new command from the guest's command queue 42a or 42b (block 140). The VMM 106 may maintain virtual command queue registers similar to those shown in FIG. 4 to record the current head and tail of the command queues 42a and 42b, respectively. The VMM 106 may read commands beginning at the current head of the command queue 42a or 42b for the virtual machine 100A or 100B from which the control register write was intercepted. The VMM 106 may also intercept reads to the control registers, to return the virtual register contents in response to the reads (not shown in FIG. 8).

If the new command is an invalidate command (decision block 142, "yes" leg), the VMM 106 may use the information in the invalidate command identifying the updated I/O translation table entry's that have been updated to search the guest I/O translation tables and locate the update translation (block 144). The VMM 106 may create a corresponding shadow translation table entry (block 146) mapping the virtual address to the corresponding physical address (based on the guest physical to physical mappings and/or assigning a new physical page, as needed). Optionally, the VMM 106 may also modify the guest I/O translation tables 36a-36b if some aspect of the translation is changed or if changing the translation simplifies the virtualization (block 148). Not shown in FIG. 8 is the case in which the VMM 106 is unable to create a translation. In such cases, error handling may be invoked.

The VMM 106 may write a modified invalidate command to the shadow command queue 42c, if necessary (e.g. to invalidate an old translation that was removed) (block 150). In other embodiments, the VMM 106 may not write the invalidate command to the shadow queue 42c, or may do so selectively based on whether the invalidate command is actually needed. If there are more commands in the guests' command queue for processing (decision block 152, "yes" leg), the VMM 106 may read the next command from the queue for processing (block 140). For example, there are more commands to process if the new tail pointer written by the intercepted control register write has not been reached yet. If all commands have been processed (decision block 152, "no" leg), the VMM 106 may write the control registers in the IOMMU 26 to cause the IOMMU 26 to process commands written to the shadow command queue 42c (block 154). The VMM 106 may also update the virtual control registers for the virtual machine 100A-100B for the virtual machine 100A-100B that was intercepted (e.g. the virtual control registers forming part of the virtual IOMMU 120A-120B) to reflect the write.

If the new command is not an invalidate command (e.g. it is a completion wait command, in one embodiment—decision block 142, "no" leg), the VMM 106 may write the command into the shadow command queue 42c for processing by the IOMMU 26 (block 150). If there are more commands in the guests' command queue for processing (decision block 152, "yes" leg), the VMM 106 may read the next command from the queue for processing (block 140). If all commands have been processed (decision block 152, "no" leg), the VMM 106 may write the control registers in the IOMMU 26 to cause the IOMMU 26 to process commands written to the shadow command queue 42c (block 154).

Figure 9:
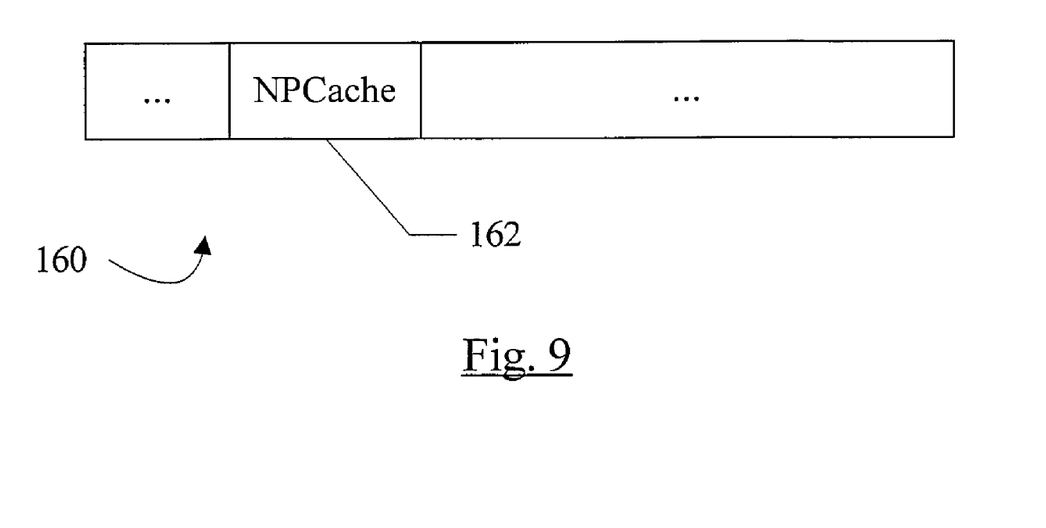
FIG. 9 is a block diagram of one embodiment of a portion of an IOMMU capability block.

FIG. 9 is a block diagram of one embodiment of the IOMMU capability block, offset 0 (reference numeral 160). Various information may be included in the block (represented by the ellipses in FIG. 9). Additionally, the NPCache bit 162 may be included. In the above embodiments, the NPCache bit has been described as being set to indicate that the IOMMU 26 may cache not-present translation table entries and clear to indicate that the IOMMU 26 may not cache such entries. Other embodiments may reverse the meanings of the set and clear states, or may use multibit indications, as desired.

Figure 10:
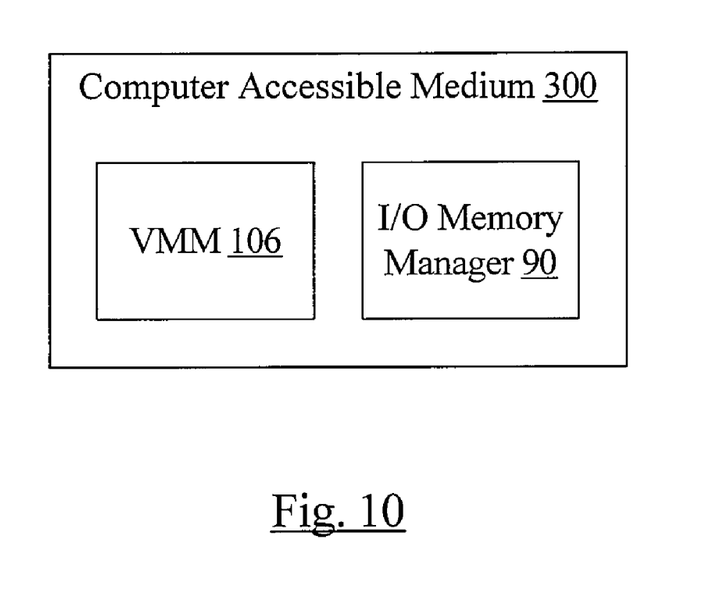
FIG. 10 is a block diagram of one embodiment of a computer accessible medium.

Turning next to FIG. 10, a block diagram of one embodiment of a computer accessible medium 300 is shown. Generally speaking, a computer accessible medium may include any media accessible by a computer during use to provide instructions and/or data to the computer. For example, a computer accessible medium may include storage media. Storage media may include magnetic or optical media, e.g., disk (fixed or removable), tape, CD-ROM, or DVD-ROM, CD-R, CD-RW, DVD-R, DVD-RW. Storage media may also include volatile or non-volatile memory media such as RAM (e.g. synchronous dynamic RAM (SDRAM), Rambus DRAM (RDRAM), static RAM (SRAM), etc.), ROM, or Flash memory. Storage media may include non-volatile memory (e.g. Flash memory) accessible via a peripheral interface such as the Universal Serial Bus (USB) interface in a solid state disk form factor, etc. The computer accessible medium may include microelectromechanical systems (MEMS), as well as media accessible via transmission media or signals such as electrical, electromagnetic, or digital signals, conveyed via a communication medium such as a network and/or a wireless link.

In the embodiment of FIG. 10, the computer accessible medium 300 may store one or more of the VMM 106 and/or the I/O memory manager 90. The computer accessible medium may store any combination of instructions which, when executed, implement the flowcharts of FIGS. 7 and 8. The computer accessible medium 300 may further store the applications and guest OSs, and/or the virtual machines shown in FIG. 5 The computer accessible medium 300 may store various data structures described herein (e.g. the CPU translation tables 50, the I/O translation tables 36, the command queue 42, the event log buffer 44, the guest translation tables 110, the host translation tables 112, the shadow translation tables 114, etc.).

Numerous variations and modifications will become apparent to those skilled in the art once the above disclosure is fully appreciated. It is intended that the following claims be interpreted to embrace all such variations and modifications.

What is claimed is:

1. A system comprising:
   one or more input/output (I/O) devices;
   an I/O memory management unit (IOMMU) coupled to receive memory requests sourced by the I/O devices and configured to provide address translation for the memory requests; and
   a virtual machine monitor (VMM) configured to manage one or more virtual machines on the system, wherein each virtual machine includes a virtual machine memory configured to store one or more data structures to communicate with a virtual IOMMU in the virtual machine, and wherein the VMM is configured to maintain a separate set of the one or more data structures which are accessable to the IOMMU, and wherein the VMM is configured to transfer information between the separate set of the one or more data structures and the one or more data structures in each virtual machine to virtualize the IOMMU into separate virtual IOMMUs for each respective virtual machine.

2. The system as recited in claim 1 wherein the VMM is configured to detect one or more updates to I/O translation tables within a first virtual machine of the one or more virtual machines, the I/O translation tables storing translation data created within the first virtual machine for use by the virtual IOMMU, and wherein the VMM is configured to generate corresponding translations in second I/O translation tables used by the IOMMU.

3. The system as recited in claim 1 wherein the one or more data structures comprises a command queue, and wherein the VMM is configured to transfer one or more commands from the command queue in the first virtual machine to a second command queue in the separate one or more data structures maintained by the VMM.

4. The system as recited in claim 3 wherein the IOMMU is configured to read commands from the second command queue.

5. The system as recited in claim 1 wherein the one or more data structures in the first virtual machine further comprise a first event log buffer, and wherein the separate one or more data structures comprise a second event log buffer, and wherein the VMM is configured to transfer events for the first virtual machine from the second event log buffer to the first event log buffer.

6. A system comprising:

one or more input/output (I/O) devices;

an I/O memory management unit (IOMMU) coupled to receive memory requests sourced by the I/O devices and configured to provide address translation for the memory requests;

a virtual machine monitor (VMM) configured to manage one or more virtual machines on the system, wherein the VMM is configured to virtualize the IOMMU, providing one or more virtual IOMMUs for use by one or more virtual machines; and wherein the IOMMU is configured to indicate whether or not the IOMMU is configured to cache not-present translation table entries in response to a particular read operation, and wherein the VMM is configured to intercept the particular read operation from the virtual machine and respond to the read, indicating that the IOMMU does cache not-present translation table entries.

7. The system as recited in claim 6 wherein each virtual machine includes a virtual machine memory, and wherein invalidate commands to the virtual IOMMU are written to a command queue in the virtual machine memory.

8. The system as recited in claim 7 wherein each virtual machine is configured to generate one or more write commands to write one or more control registers in the virtual IOMMU that control the virtual IOMMU access to the command queue, and wherein the VMM is configured to intercept the write commands.

9. The system as recited in claim 8 wherein the VMM is configured to read the command queue in the virtual machine memory in response to intercepting a write command, to determine the updates to I/O translation tables in the virtual machine memory corresponding to invalidate commands in the command queue.

10. The system as recited in claim 9 wherein the VMM is configured to read the updated entries in the I/O translation tables to determine I/O translation table updates to be made to a second I/O translation table that is used by the IOMMU.

11. The system as recited in claim 7 wherein the VMM is configured to transfer non-invalidate commands from the command queue in the virtual machine to a second command queue used by the IOMMU.

12. The system as recited in claim 11 wherein the VMM is further configured to transfer the invalidate commands to the shadow command queue.

13. The system as recited in claim 12 wherein the VMM is further configured to update the one or more control registers in the IOMMU that control the IOMMU access to the command queue.

* * * * *